2,728,799

REFINEMENT OF BENZENE HEXACHLORIDE

James C. Hetrick, Detroit, Mich., and William T. Donaldson, Oak Ridge, Tenn., assignors to Ethyl Corporation, New York, N. Y., a corporation of Delaware No Drawing. Application April 29, 1952,
Serial No. 285,052

3 Claims. (Cl. 260—648)

This invention relates to the isolation of mixtures of benzene hexachloride isomers, and more particularly to a new and improved method for the isolation of products containing high proportions of the gamma isomer.

As prepared by the additive chlorination of benzene, 1,2,3,4,5,6-hexachlorocyclohexane, hereafter referred to as benzene hexachloride, comprises a mixture of stereoisomers, of which five have been isolated and characterized to date. A typical isomer distribution is alpha—65 per cent, beta—10 per cent, gamma—13 per cent, delta—8 per cent, and epsilon—4 per cent. This mixture is commonly referred to as "crude" benzene hexachloride. Of the five known isomers, the gamma isomer is the most significant from the standpoint of insecticidal potency. The gamma isomer is never formed, in commercial processes, to a greater extent than about 15 per cent of the total amount of benzene hexachloride produced. Processes for concentrating the gamma isomer, and thus increasing the insecticidal activity of benzene hexachloride, therefore, are desirable commercially.

A method hitherto employed for gamma enrichment of crude benzene hexachloride comprises chlorinating benzene until the benzene is essentially saturated with the $\alpha$ and $\beta$ isomers, then cooling the mixture to precipitate the $\alpha$ and $\beta$ isomers, thus leaving in solution a benzene hexachloride enriched in gamma isomer. While it is true that use of this procedure results in an increase in gamma content of the benzene hexachloride, the yield of high-gamma material and the gamma content itself of the enriched fraction leave much to be desired. Moreover, use of this technique results in the formation of a dense mass of extremely small crystals of by-product (principally $\alpha$ and $\beta$) benzene hexachloride isomers. The filtration and wash characteristics of this mass are quite poor, leading to a considerable loss of gamma isomer by retention of solution on the filter cake.

It is an object of our invention, therefore, to provide a simple, practicable, highly efficient means of obtaining a high yield of gamma-rich benzene hexachloride from benzene hexachloride isomer mixtures.

We have discovered that by holding an emulsion of water, benzene hexachloride and a selective solvent of the type described below at a temperature at which the amount of benzene hexachloride present exceeds the solubility of benzene hexachloride in the amount of solvent present and separating the emulsion and solid phases upon approaching or attaining liquid-solid equilibrium in the system, the emulsion phase contains a mixture of benzene hexachloride isomers having a gamma isomer content considerably higher than does the benzene hexachloride in the solid phase and consequently higher than that of the benzene hexachloride originally treated. Stated in other terms, our invention comprises holding an emulsion of water, solvent and benzene hexachloride at a temperature at which a portion of the benzene hexachloride is in the solid phase, and separating the solid phase from the emulsion phase after the system has been held for a finite time at said temperature. A preferred form of the invention comprises holding an emulsion of water, solvent and benzene hexachloride at a temperature at which a portion of the benzene hexachloride is in the solid phase, and separating the solid phase from the emulsion phase upon essential attainment of liquid-solid equilibrium in the system. In this preferred modification, we realize our highest yields and highest gamma contents of our enriched benzene hexachloride, and also attain the solid phase in the most desirable crystalline state. The emulsion can either be formed at the temperature of operation or formed at a different temperature and then either heated or cooled to the operating temperature.

Solvents which are useful in our process are those possessing two attributes. The first of these is that the solvent be selective for gamma benzene hexachloride; that is, the solvent must have a solubility for gamma benzene hexachloride not less than that for alpha benzene hexachloride. The second attribute is that the solvent be one which, when containing substantial amounts of benzene hexachloride in solution, has a range of immiscibility with water; that is, one which, when containing benzene hexachloride in solution, is not miscible in all proportions with water. Typical examples of such solvents include benzene, toluene, chloroform, carbon tetrachloride, dichloroethylene, ethylidene chloride, perchloroethylene, ethylene dichloride, trichloroethylene, isobutyl chloride, methyl acetate, ethyl acetate, methyl propionate, n-butyl acetate, cyclohexane, cyclohexene, cyclohexanol, decahydronaphthalene, ethyl benzene, trimethylbenzenes, propylbenzenes, diethylbenzenes, xylenes, kerosenes, n-butyl bromide, ethyl ether, dioxane, dioxanemethanol, and the like. Certain of these solvents are miscible with water in the pure form, but when containing substantial amounts of benzene hexachloride in solution are found to possess a range of immiscibility with water. In the case of such solvents, the amount of dissolved benzene hexachloride necessary to impart a range of immiscibility with water can readily be determined by experimentation. We prefer solvents which possess inherently a range of immiscibility with water, particularly aromatic mononuclear hydrocarbons, most particularly benzene.

Surprisingly, the practice of our invention results in a higher yield of higher gamma benzene hexachloride than does the previous method of crystallizing from solution. This is unexpected in view of the facts that the solubility of benzene hexachloride in water is essentially nil and that the addition of water to the system organic solvent-benzene hexachloride does not appreciably alter the relative solubilities of the benzene hexachloride isomers in benzene or any of our selective solvents.

There are a number of alternative means of carrying out our invention, some of which are illustrated below. In general, we prefer to start with a solution of benzene hexachloride in a solvent, such as a solution produced in the photochlorination of benzene with chlorine in the presence of excess benzene. We ordinarily employ concentrations of benzene hexachloride in solution up to a ratio of about 10 parts of benzene hexachloride to 1 part of solvent by weight. For highest yields and highest purity of gamma-enriched benzene hexachloride the ratio of benzene hexachloride to solvent should be at least 4.5 to one. Our preferred ratio of benzene hexachloride to solvent, therefore, varies from approximately 4.5 to 1 to approximately 10 to 1. This means that under ordinary circumstances we prefer to concentrate our benzene hexachloride-benzene solution when starting with solutions from a chlorination reactor.

When we begin with a solution of benzene hexachloride in solvent in the ratio of 4.5 to 10 parts by weight of benzene hexachloride per part of solvent, there are several alternative modes of operation. For example, we can emulsify the solution with water, cool the emulsion to a temperature at which a portion of the benzene hexachloride exists as a solid phase, hold the mixture at this temperature until the approach or attainment of liquid-solid equilibrium in the system, then accomplish a separation of emulsion and solid phases. Alternatively, we can cool the benzene hexachloride-solvent solution to a temperature at which a portion of the benzene hexachloride is present as a solid phase, emulsify the solution-solid benzene hexachloride mixture with water, allow a finite time to elapse, and effect a solid-emulsion phase separation. A further alternative comprises cooling the solution of benzene hexachloride in solvent to a temperature at which a portion of the benzene hexachloride exists as a solid phase, allow a finite time to elapse, emulsify the mixture with water, permit a further small finite time to elapse, and effect a solid-liquid phase separation. Of the above alternative methods of operation, we prefer the first, for reasons of convenience in operation. Still other modes of operation within the spirit of our invention, one of which is illustrated in Example IV below, will occur to those skilled in the art.

Our invention, however, is not limited to those embodiments wherein the starting material is a solution of benzene hexachloride. For example, solid benzene hexachloride can be mixed with solvent in amount insufficient to dissolve all the benzene hexachloride at the temperature used, the resulting mixture emulsified with water, held at this temperature for a finite time, and then separated into its emulsion and solid phases. In addition to these above variations, solid benzene hexachloride can be treated with a solvent-water emulsion, containing either sufficient or insufficient solvent to dissolve all the benzene hexachloride contacted. The resultant multi-component emulsion is then processed by the appropriate technique or techniques as outlined above.

With each of the above as well as with other embodiments of our invention, it is advantageous to wash the solid phase, after emulsion-solid separation has been accomplished, with a low-boiling solvent, such as an aliphatic hydrocarbon or mixture of hydrocarbons, e. g. petroleum ether. This results in the obtaining of additional quantities of gamma-enriched benzene hexachloride in solution. Any solvent which is miscible with the selective solvent employed and has a weak or negligible dissolving power for benzene hexachloride is suitable for washing the filter cake. Because they possess these attributes and also have the advantage of high volatility, we prefer to use low-boiling aliphatic hydrocarbons, such as propane, butanes, pentanes, etc., and mixtures of low-boiling aliphatic hydrocarbons, such as petroleum ether.

A critical feature of our invention is that the water-solvent-benzene hexachloride emulsion must be held for a finite time at a temperature at which a portion of the benzene hexachloride is in the solid state; in other words, at a temperature at which the amount of benzene hexachloride present exceeds the solubility of benzene hexachloride in the amount of solvent present, before emulsion-solid separation is made. The solid precipitated initially upon reaching the appropriate temperature does not have the same composition as the solid present upon attainment of solid-liquid equilibrium in the system, at which time each of the benzene hexachloride isomers has distributed itself between the emulsion and solid phases according to its equilibrium value. As time proceeds, however, the gamma content of the solid phase, and accordingly, the gamma content of the emulsion, continually change in the direction of their equilibrium values. At any finite time, after the emulsion-solid mixture is brought to the desired temperature, the gamma content of the benzene hexachloride in the emulsion phase is enriched over its initial content in the emulsion phase. We can separate our solid and emulsion phases, therefore, at any finite time, even as small as one minute, after the emulsion-solid mixture has been brought to the desired temperature and achieve an improvement in gamma content of the emulsion phase. Maximum gamma content of the benzene hexachloride in the emulsion phase is achieved, however, upon attainment of liquid-solid equilibrium in the system, and in certain forms of our invention we prefer to make our phase separation not sooner than upon essential attainment of equilibrium. The solid-phase benzene hexachloride is also present in the most conveniently handled form when the system is essentially at equilibrium.

We ordinarily operate with any ratio of benzene hexachloride to solvent in the emulsified mixture up to a ratio of about 10 parts of benzene hexachloride to 1 part of solvent by weight. For highest yields and highest purity of gamma-enriched benzene hexachloride the ratio of benzene hexachloride to solvent should be at least 4.5 to 1. Our preferred weight ratio of benzene hexachloride to solvent, therefore, varies from approximately 4.5 to 1 to approximately 10 to 1.

The ratio of water to solvent can be varied over a wide range. Benefits of our invention are obtained so long as sufficient water is used to result in two immiscible liquid phases. With some solvents, this can be as little water as about one per cent the weight of solvent employed.

It is desirable in most instances to employ at least 5 parts of water per part of solvent, so as to attain a pronounced degree of dispersion of gamma benzene hexachloride throughout the mixture. On the other hand, ratios of water to solvent exceeding about 10 to 1 necessitate the handling of excessively large volumes of liquid, as well as dissolving appreciable quantities of solvent in some cases. We prefer, therefore, to operate with water to solvent ratios lying between about 5/1 and about 10/1.

Any of the ordinary emulsification techniques, such as mechanical agitation, aeration, ultrasonic oscillation, and the like, can be used to form the emulsions of our invention. It is advantageous to use chemical emulsifying agents as aids in forming and stabilizing our emulsion. Any of the common surface-active agents can be used to promote formation and stability of our emulsions. Suitable agents include those of the anionic type, such as sodium stearate, sodium alkyl sulfates, sodium oleic-acid sulfonate, esters of succinic acid and esters of sulfonated succinic acids; those of the nonionic type, such as polyglycol fatty acid esters, polyoxypropylene fatty acid esters, polyoxypropylene fatty alcohol ethers; and those of the cationic type, such as amine hydrochlorides and quaternary ammonium salts. In general, we prefer to use surface-active agents of the anionic type, particularly salts of sulfonated succinic esters. The greatest effectiveness of these surface-active agents is exhibited when they are present in concentrations of from 0.05 to 1.0 per cent of the weight of water used.

The temperature at which we treat our mixtures prior to phase separation can be varied over a wide range with the optimum temperature in any particular case depending on the composition of the original solvent-benzene hexachloride mixture. We prefer to operate in the range 30–40° C., since we obtain optimum yield and purity of high-gamma benzene hexachloride at these temperatures and because of the convenience of operating at substantially room temperature, thus eliminating the need for refrigeration or excessive heating. However, in some cases we operate at temperatures as low as 10° C. and as high as 80° C. The time of treatment is dependent upon the temperature of operation, and upon the degree of enrichment desired, since the rate of attainment of composition equilibrium between the solid and emulsion phases of our system is a function of temperature and the greatest degree of enrichment is realized at equilibrium conditions. Generally, we attain equilibrium conditions in about one to two hours, although in specific cases equilibrium can be reached in shorter intervals of time, and in large-scale operation attainment of equilibrium can require longer times, such as 3 to 4 hours. When operating under non-equilibrium conditions, we can make our phase separation in a short time, such as one minute or a few minutes, after the system has been brought to the operating temperature.

Although we prefer to separate our liquid and solid fractions by filtration, other means such as centrifugation, decantation and the like are applicable.

The gamma-enriched benzene hexachloride which we obtain as described above can be utilized in a variety of ways. For examle, the solvent-water-enriched gamma benzene hexachloride can be used as such as an insecticide; or the volatile components of the mixture, namely water and organic solvent, can be removed by evaporation, leaving as a residue a high-gamma benzene hexachloride. This high-gamma material can be used insecticidally as such, or it can be redissolved and recrystallized from an organic solvent such as benzene, methanol, ethanol, isopropanol, and the like, or a solvent pair, such as benzene-petroleum ether, methanol-water, and the like, producing a benzene hexachloride isomer mixture with an even higher gamma content.

In addition to these methods, we can also resolve the emulsified filtrate by ordinary means such as the addition of electrolytes, for example sodium chloride, calcium chloride, hydrochloric acid and the like, or by mechanical means, such as freezing or passing the emulsion through a bed of fibrous material, into a solvent-high-gamma benzene hexachloride solution phase, and an aqueous phase. The solution of high-gamma benzene hexachloride in solvent may be used directly as an insecticide, or diluted with benzene or another good solvent for benzene hexachloride, and the diluted solution used as an insecticide.

The high-gamma benzene hexachloride produced by our process can also be treated in other ways, such as: steam distillation to remove a portion of the solvent, followed by recrystallization of benzene hexachloride from the residual emulsion, thus yielding an isomer mixture further enhanced in gamma content; distilling, by steam or other means, a portion of the solvent from the emulsion, adding to the residual emulsion a solvent having little or no solubility for benzene hexachloride, for example an aliphatic hydrocarbon or mixture thereof, and recrystallizing benzene hexachloride therefrom, thus further enhancing the gamma content; adding a solvent of the type described above, thereby crystallizing benzene hexachloride which is further enhanced in gamma content. Other means of processing our gamma-enriched benzene hexachloride will be apparent to those skilled in the art.

The following examples, in which all parts and percentages mentioned are parts or percentages by weight, demonstrate the advantages of our invention in obtaining high yields of a high-gamma benzene hexachloride.

*Example I*

A solution of 300 parts crude benzene hexachloride, containing 36 parts gamma isomer, in 810 parts of benzene, was distilled to a composition of 300 parts crude benzene hexachloride and 65 parts benzene. To this was added 500 parts of water containing 0.5 per cent of sodium-2-sulfonato dioctyl succinate. The mixture was cooled to 30° C. and agitated for 4 hours. At the end of that time the mixture was filtered, and the emulsified filtrate treated with 150 parts of 20 per cent sodium chloride solution, yielding 138 parts of organic phase, containing 85 parts of 30 per cent gamma benzene hexachloride, comprising 74 per cent of the gamma isomer originally present.

Thus, in the above example, the gamma content of the benzene hexachloride was readily and efficiently increased from 12 per cent to 30 per cent, with recovery of 74 per cent of the gamma isomer.

Good results are also obtained when the procedure of Example I is carried out using a weight ratio of 3 parts of benzene hexachloride to 1 part of benzene. Good results are obtained when we bring our system to equilibrium at other temperatures lying between 10° C. to 80° C. When we make our phase separation at a time before liquid-solid equilibrium has been reached, for example, at times of 1 minute or 5 minutes after the system has been brought to the operating temperature, we obtain enrichment of gamma content in the smulsion phase.

When this procedure is repeated, using instead of benzene the solvents toluene, chloroform, ethyl acetate, kerosene, ethyl benzene, dioxane, ethylene dichloride and the like, equally satisfactory results are obtained.

The following example illustrates results obtained with a slight modification of the above procedure.

*Example II*

A solution of 300 parts of crude benzene hexachloride, containing 39 parts of gamma benzene hexachloride in 800 parts of benzene was distilled until the composition was essentially 300 parts of crude benzene hexachloride and 55 parts of benzene. To this solution was added 540 parts of water containing 0.25 per cent sodium-2-sulfonato-di-octyl succinate. The mixture was cooled to 30° C. and agitated at that temperature for two hours. At the end of that time the mixture was filtered, and the emulsified filtrate treated with 100 parts of sodium chloride. The resultant organic phase was separated from the aqueous phase and, after removal of benzene, yielded 39 per cent gamma benzene hexachloride in 64 per cent gamma yield.

In a repetition of this example, using the same conditions and starting material of the same gamma content, a 70 per cent yield of 39 per cent gamma benzene hexachloride was obtained.

The following two examples demonstrate alternative modes of operation of our invention, leading to substantially the same result.

*Example III*

A mixture of 300 parts of crude solid benzene hexachloride containing 39 parts of gamma isomer, 55 parts of benzene, and 540 parts of water containing 0.25 per cent of sodium-2-sulfonato-di-octyl succinate, was stirred mechanically for 3 hours at a temperature of 30° C. At the end of this time, the mixture was subjected to the filtration and de-emulsification operations as described in Example I. The yield based on gamma benzene hexachloride was 84 per cent of 33 per cent gamma benzene hexachloride.

*Example IV*

1000 parts of photochlorination reactor solution containing 730 parts of benzene and 270 parts of benzene hexachloride including 32.4 parts of the gamma isomer was mixed with 1000 parts of 0.5 per cent soap solution and the emulsion distilled until 703 parts of benzene were removed. The mixture was brought to equilibrium at 30° C., and then filtered and the filtrate treated as in Example I, giving 110 parts of benzene hexachloride containing 28.6 parts of the gamma isomer, for a recovery of 88 per cent.

The following example illustrates additional benefits obtained when a wash of the solid benzene hexachloride phase is incorporated into our process.

*Example V*

An emulsion of 600 parts benzene hexachloride containing 72 parts of gamma benzene hexachloride, 105 parts of benzene, and 500 parts of water containing 0.1 per cent of a sodium alkylarylsulfonate was held at 30° C. until liquid-solid equilibrium was established. This required two hours. The mixture was then filtered, and the filtrate processed as illustrated above, yielding 34 per cent gamma benzene hexachloride in gamma yield of 43 per cent. The solid-phase benzene hexachloride from this operation was washed on the filter, with 500 parts of petroleum ether, yielding in the petroleum ether solution an additional 66 parts of benzene hexachloride containing 25 parts of gamma benzene hexachloride. The overall yield was 78 per cent of 35 per cent gamma material.

The procedures of Examples II, III, IV and V, when repeated with other solvents, such as toluene, carbon tetrachloride, dichloroethylene, isobutyl chloride, methyl acetate, cyclohexane, diethyl ether and the like, give equally satisfactory results.

As the above examples demonstrate, an 88 per cent yield of gamma isomer can readily be obtained as a 33 per cent or higher concentrate.

In order to clearly point out the benefits of our invention, the following examples illustrate results obtained when the alpha and beta isomers are precipitated from benzene solution without use of the water emulsification process, as in previous methods of operation.

*Example VI*

A mixture of 300 parts of crude benzene hexachloride containing 39 parts of gamma benzene hexachloride and 50 parts of benzene was stirred at 30° C. until equilibrium was established. Filtration of the mixture and subsequent evaporation of the benzene from the filtrate resulted in the recovery of 25 parts of benzene hexachloride containing 10 parts of gamma benzene hexachloride.

Thus, although the gamma content of the high-gamma fraction is at the respectable level of 40 per cent, the yield of only 25 per cent means that three-fourths of the valuable gamma isomer has been lost. In contrast, our invention provides a means for recovery of at least 65 per cent, and as much as 88 per cent, of gamma benzene hexachloride, with gamma content ranging up to 40 per cent or higher.

Although we obtain our best results when using as the starting material "crude" or commercial benzene hexachloride, our invention is not limited to this starting material, but can be used also to obtain gamma concentration of benzene hexachloride having higher initial gamma content than does crude benzene hexachloride. Generally, however, when starting with material having a gamma content greater than about 50 per cent, less favorable results are obtained.

We claim:

1. A process for enhancing the gamma isomer concentration of crude benzene hexachloride, comprising agitating at a temperature of between about 10–80° C. a mixture of crude benzene hexachloride, water, a solvent for said benzene hexachloride which is essentially immiscible with water, and a chemical emulsifying agent to effect emulsification of at least a part of the benzene hexachloride with the solvent and water, said benzene hexachloride being employed in a ratio of about 1 to 10 parts per part of solvent, said water being employed in a quantity of at least 1 percent by weight of said solvent, and thereafter separating the emulsion so-formed containing an enhanced proportion of the gamma isomer from the relatively low gamma isomer containing undissolved solids.

2. The process of claim 1 wherein agitation of the mixture is maintained for at least one hour.

3. The process of claim 1 wherein not more than 4.5 parts of benzene hexachloride is employed per part of solvent and wherein between about 5 and 10 parts of water are employed per part of solvent.

References Cited in the file of this patent

UNITED STATES PATENTS

| | | |
|---|---|---|
| 2,474,590 | Morey | June 28, 1949 |
| 2,553,956 | Burrage et al. | May 22, 1951 |
| 2,622,105 | Miller et al. | Dec. 16, 1952 |